United States Patent
Hatakeyama et al.

[11] Patent Number: 5,889,093
[45] Date of Patent: Mar. 30, 1999

[54] OXYGEN-ABSORBING RESIN COMPOSITION AND PACKING MATERIAL, MULTI-LAYERED PACKING MATERIAL, PACKAGE AND PACKING METHOD USING THE SAME

[75] Inventors: Hidetoshi Hatakeyama; Haruaki Eto, both of Katsushika-ku, Japan

[73] Assignee: Mitsubishi Gas Chemical Company, Inc., Tokyo, Japan

[21] Appl. No.: 794,405

[22] Filed: Feb. 3, 1997

[30] Foreign Application Priority Data

Feb. 3, 1996 [JP] Japan .................................. 8-058292

[51] Int. Cl.[6] .............................. C08K 3/16; C08K 3/10
[52] U.S. Cl. ......................... 524/80; 524/435; 524/439; 524/440; 428/35.2; 428/35.3; 428/35.4; 428/35.8; 428/35.9; 252/188.28
[58] Field of Search ..................... 252/188.2; 428/35.2, 428/35.3, 35.4, 35.8, 35.9; 524/80, 435, 439, 440

[56] References Cited

U.S. PATENT DOCUMENTS

| | | | |
|---|---|---|---|
| 4,127,503 | 11/1978 | Yoshikawa et al. ................ | 252/188.28 |
| 4,230,595 | 10/1980 | Yamaji et al. ......................... | 252/188 |
| 5,034,252 | 7/1991 | Nilsson et al. ......................... | 524/538 |
| 5,194,478 | 3/1993 | Frandsen et al. ................... | 252/188.28 |
| 5,241,149 | 8/1993 | Watanabe et al. ...................... | 428/35.2 |
| 5,262,375 | 11/1993 | McKeady ........................... | 252/188.28 |
| 5,274,024 | 12/1993 | Koyama et al. ......................... | 524/439 |
| 5,641,825 | 6/1997 | Bacskai et al. ......................... | 524/413 |

FOREIGN PATENT DOCUMENTS 0 036 575  9/1981  European Pat. Off. .

*Primary Examiner*—Peter A. Szekely
*Attorney, Agent, or Firm*—Fish & Richardson P.C.

[57] ABSTRACT

The present invention provides an oxygen-absorbing resin composition, which is capable of sufficiently causing the oxygen-absorbing reaction even in a low-water environment, and also provides a packing material, packing method and package using such oxygen-absorbing resin composition.

This invention is an oxygen-absorbing resin composition which contains a resin and an oxygen absorber which is made by coating iron powder with sodium iodide and potassium iodide. In a multi-layered film formed from this resin composition, iron particles coated with sodium iodide, etc. is dispersed in an oxygen-absorbing resin layer 4. Since a reaction accelerator of the oxygen absorber contains sodium iodide and potassium iodide as its principal component, this multi-layered film sufficiently absorbs oxygen in a low-water environment.

18 Claims, 1 Drawing Sheet

OXYGEN-ABSORBING RESIN COMPOSITION AND PACKING MATERIAL, MULTI-LAYERED PACKING MATERIAL, PACKAGE AND PACKING METHOD USING THE SAME

BACKGROUND OF THE INVENTION

1. Field of the Invention

The present invention relates to an oxygen-absorbing resin composition which contains an oxygen absorber and a thermoplastic resin. This invention also relates to a packing material composed of this resin composition. Furthermore, this invention relates to a package and a packing method for preserving a substance in a dried state with a low water content (mainly, dried food) by utilizing the above-mentioned packing material.

2. Description of the Prior Art

An oxygen absorber which utilizes an oxidation reaction of a reduced metal has been widely known. Other than the reduced metal, this oxygen absorber comprises a metal halide as an accelerator for promoting the oxidation reaction of the reduced metal.

In order to mainly preserve the freshness of food, this type of oxygen absorber is placed together with a preserved substance such as food in a container or a packing material, or the oxygen absorber is contained within a container or a sheet material, which is then used to package a substance to be preserved such as food.

The Japanese Patent (Kokoku) Publication No. SHO 56-33980 discloses an oxygen absorber of metal powder coated with a metal halide. Since a deoxidation reaction of a reduced metal requires the existence of water, this type of oxygen absorber is used to preserve a food containing a large amount of water, which is capable of utilizing water transpired from the preserved substance.

On the other hand, in order to preserve a substance having a low water content (i.e., having a low water activity ($a_w$)), such as dried food, a water-supplying component is included in an oxygen absorber in order to supplement water necessary for the oxygen-absorbing reaction. This type of oxygen absorber is known as a self-reacting type which is capable of absorbing oxygen without depending on water from the preserved substance.

The recent practice has been to package a preserved substance by using a sheet-shaped packing material which is made by kneading an oxygen absorber with a resin and forming the kneaded mixture into a sheet or film. However, if the self-reacting type of oxygen absorber which holds water is used to preserve a substance having a low water content, the transfer of water from the water-holding component to the preserved substance cannot be prevented. This results in problems in that the water spoils the taste of the preserved substance (due to humidity), changes the properties of the preserved substance (that is, solidification of powder), causes a chemical change (or hydrolysis), or causes propagation of bacteria. In some case, another problem is caused in that the oxygen absorber loses the water necessary for deoxidation and then becomes incapable of absorbing oxygen.

Furthermore, as the self-reacting type of oxygen absorber which holds water is heated when it is kneaded with a resin in order to be formed into a sheet, there is a problem in that not only water in the water-holding component evaporates, but also the evaporated water generates bubbles within the resin sheet, the surface of the resin sheet is made uneven and good surface properties of the sheet cannot be obtained.

On the other hand, when an oxygen absorber holding no water (water-dependent type) is kneaded with a resin to obtain a sheet material, it is necessary to perform the treatment for making the oxygen absorber hold water. However, if the resin sheet is made to hold water, this oxygen-absorbing resin sheet takes over the above-described defects of the self-reacting oxygen absorber.

Accordingly, the conventional oxygen-absorbing sheet is limited for the practical use to the type which itself contains no water and which is capable of absorbing oxygen by acquiring water from a food having a high water content which contains moisture necessary for the oxygen-absorbing reaction. This oxygen-absorbing sheet is usually applied to a food containing a large amount of water.

Because of the reasons described above, those skilled in the art have had difficulties in realizing an oxygen absorbing sheet capable or causing the deoxidation even in a low-water environment. In other words, it has been difficult to package a dried food, that is, a substance having a low water content, in good condition in a low oxygen environment by using the conventional oxygen absorber.

Through diligent studies to solve the above-described problems, the inventors of this invention have found that iodide and bromide, which have been completely disregarded as being inferior as an accelerator for the oxygen-absorbing reaction to chloride, such as potassium chloride or sodium chloride, can surprisingly and sufficiently function as the accelerator for the oxygen-absorbing reaction to preserve a packaged substance (or preserved substance) having a low water content by requiring the existence of almost no water-holding component.

The aforementioned Japanese Patent (Kokoku) Publication No. SHO 56-33980 lists iodide and bromide as one of the accelerators for the oxygen-absorbing reaction, but does not disclose the oxygen absorber which has an oxidation accelerator containing a metallic salt of iodine or bromine as its principal component and which is appropriate for the preservation of a substance having a low water activity.

Although the Japanese Patent (Kokoku) Publication No. HEI 2 22701 discloses an oxygen absorber which is composed of a halide of basic anion exchange resin and an iron powder and which does not require the use of water soluble substances, it does not aim at providing a halide as an oxygen absorber capable of functioning even in a low humidity atmosphere and in a dry condition. It does not actually consider that a metallic salt or iodine or bromine can fully function as an accelerator in a dry condition.

Accordingly, the object of the present invention is to provide an oxygen-absorbing resin composition capable of sufficiently exhibiting the oxygen-absorbing function even in the low humidity atmosphere. Another object of this invention is to provide an oxygen-absorbing resin composition having good thermoformability.

A further object of this invention is to provide an oxygen-absorbing member and packing material in the form of a sheet or film, and a packing container, which are capable of exhibiting a sufficient oxygen-absorbing function in the low humidity atmosphere.

Another object of this invention is to provide a package to preserve a substance having a low water content, which requires the low-humidity preservation condition, in the atmosphere of low oxygen concentration. A further object of this invention is to provide a method for a preserving a substance having a low water content, which method makes it possible to maintain the substance having a low water content in the atmosphere of low oxygen concentration by using the above-mentioned oxygen-absorbing resin composition.

SUMMARY OF THE INVENTION

The present invention is characterized in that it is an oxygen-absorbing resin composition made by kneading or dispersing an oxygen absorber, which contains a reduced metal and an accelerator containing a metallic salt of iodine or bromine as its principal component, in a thermoplastic resin. By forming this resin composition, a packing material (or oxygen-absorbing member) with the water content of 1% or less in the shape of a sheet or film or in the molded form, the shape of which is not limited as a packing container, such as a tray, cup, tube or bag, can be obtained. This oxygen-absorbing member is obtained by being coating and packed with air-permeable materials which are permeable to oxygen. This invention is also characterized in that it is a multi-layered member which is made by providing a gas-permeation-resistent outside layer on one side of an intermediate layer, which is composed of the oxygen absorber composition, on the side facing the atmosphere, and by providing an air-permeable inside layer on the other side of the intermediate layer facing the packaged substance placed inside of the multi-layered member. The packing container is composed of this multi-layered member. As long as the packing container can achieve desirable effects, this multi-layered member may be used only for a part of the container. This multi-layered packing material is formed into, for example, a sheet or film. This invention is also characterized in that it is a method for preserving a substance having a low water content and low water activity in the low-humidity atmosphere in a hermetically sealed manner by using the above-mentioned packing material and packing container, and that it is a package which uses this oxygen-absorbing member to preserve the substance, which is in a dried state, by keeping the preserved substance in the atmosphere of low humidity and low oxygen concentration in a hermetically sealed manner.

DESCRIPTION OF THE PREFERRED EMBODIMENTS

Figure 1:
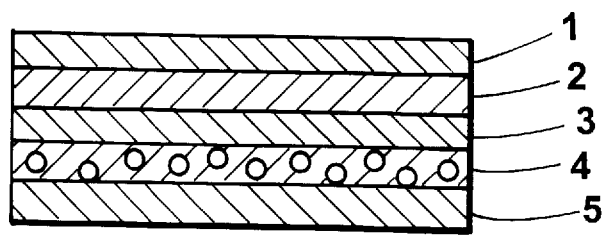
FIG. 1 is a sectional view of one embodiment of the multi-layered film of this invention.

The present invention is hereinafter explained in more detail. As known components, as well as contents and a manufacturing method thereof, of the composition of this invention, known prior arts can be used as reference. For example, the aforementioned Japanese Patent (Kokoku) Publication No. SHO 56-33980, for which an application was filed by the applicant of this invention, can be referred to.

Known reduced metals can be used as an oxygen-absorbing component or a deoxidizing component. It is preferable to use metal iron. Specific examples are: granular metal powder such as iron powder, copper powder or zinc powder, among which iron powder is preferable. These metals are used solely or in combination. The average grain diameter of the reduced metal is 100 $\mu$m or less, preferably 50 $\mu$m or less, in order to have a good contact with oxygen. Reduced powder, electrolytic powder, atomized powder, etc. are preferable as metal powder. For example, reduced iron powder, electrolytic iron powder and atomized iron powder are preferable A pulverized or ground form of cast iron, etc. is also used. Since metal powder of a very small grain diameter has a problem in handling such as combustion and is also expensive, metal powder of an average grain diameter of 1–50 $\mu$m is used.

Examples of a metallic salt of iodide or bromide as electrolytic halide are electrolytic metallic salt, alkali metallic salt or alkaline earth metallic salt, and are any one of metallic salts of copper, zinc, aluminum, tin, iron, cobalt, nickel, etc. or a combination of the above listed metallic salts. For example, sodium bromide, potassium bromide, sodium iodide, potassium iodide, cadmium iodide, or mercury iodide. Iodide is preferred because it is superior in the oxygen-absorbing property in low humidity. On the other hand, bromide is preferred from the viewpoint of safety against foods.

Moreover, sodium iodide or potassium iodide, or a combination thereof is preferable in order to avoid the use of heavy metals. As for bromide, sodium bromide and potassium bromide are preferable.

The reaction accelerator (or activator) contains iodide or bromide as its principal component. The expression "principal" is used in a relative sense. Namely, it means that the existence of other substances such as halide is permissible within the extent that the resin composition will not be hindered from causing the oxygen-absorbing reaction even in a low-water environment. In a preferred embodiment, the content of the iodide or bromide in the reaction accelerator is 90 wt % or more, preferably 95 wt % or more.

The reaction accelerator of this invention may be mixed with the reduced metal powder, but it is desirable to coat the reaction accelerator over the metal powder. The content of the reaction accelerator in the oxygen absorber may be within a known range. For example, the coating amount of the reaction accelerator is 0.1–20 parts by weight of the iodide or bromide against 100 parts by weight of the reduced metal. If the reaction accelerating component is attached to the surface of the metal and if the metal and iodide or other metallic salt do not separate from each other when the oxygen absorber is mixed in the resin so that the accelerator reaction can be fully expected, the content of iodide or other metallic salt may be 0.1–10 parts by weight, more preferably 0.5–6 parts by weight.

The thermoplastic resin in which the oxygen absorber is mixed is not specifically limited as long as it is permeable to oxygen. A preferred oxygen permeation coefficient is 200 cc 0.1 mm/m$^2$·atm·day (23^, RH100%) or more. Particularly, polyethylene, polypropylene, various kinds of ethylene copolymer, modified polyolefine, elastomer or the like may be used solely or in combination. An appropriate thermoplastic resin is selected from the above-listed substances by taking into consideration the adhesiveness between the gas-permeation-resistent outside layer and the inside layer as described below.

The oxygen-absorbing resin composition of this invention is designed to be suitable for the preservation of a substance having a low water content. Accordingly, when the resin composition is formed into, for example, a sheet, the sheet itself contains substantially no water-holding component. The sheet preferably has good thermoformability without causing any inconvenience such as generation of bubbles at the time of thermoforming processing, has the water content of 1 wt % or less, preferably 0.2 wt %, and is capable of sufficiently causing the oxygen-absorbing reaction in the above-described condition.

As heat is applied to form the oxygen absorber of this invention mixed in the thermoplastic resin into, for example, a sheet (by heating the resin at a temperature no lower than the melting temperature of the resin), the above-described maximum value of the water content is usually attained.

When the thermoplastic resin and the oxygen absorber are kneaded, the water content of the oxygen absorber is 1 wt %, for example, 0.1 wt % or less, against the thermoplastic resin and the oxygen absorber. More water does not necessarily have to be retained in order to have the oxygen absorber exhibit its oxygen-absorbing performance. This makes it possible to avoid the remaining water in the sheet or the occurrence of inconvenient changes, i.e., generation of bubbles, on the surface of the sheet when the resin sheet is made from the resin composition.

In order to remove the water contained in the oxygen absorber, the oxygen absorber may contain alkaline earth metals, water absorber (such as diatomaceous earth, pulp or water-absorbing polymer), odor absorbent (such as activated carbon, molecular sieve), or coloring pigment (such as titanium oxide, iron oxide or carbon black). The resin layer containing the oxygen absorber may be drawn and perforated after the dispersion of the oxygen absorber in the resin in order to enhance the air permeability.

The gas-permeation-resistant outside layer is determined to be appropriate according to the manufacturing method, purpose of use, etc. of the packing material to be made. Namely, for a sheet manufactured by coextrusion or a molded form thereof (such as tray or cup), it is preferable to use ethylene-vinyl alcohol copolymer or nylon MXD6 (made by MITSUBISHI GAS CHEMICAL CO., INC.) as a coextrusion material for producing the outside layer. In order to form a film by pasting (or laminating) processing, it is desirable to use, other than the above-described resin film, polyvinylidene chloride for coating, or a film of polyester or nylon with metallic oxide, such as aluminum oxide or silicon oxide, evaporated thereon, or a metal foil or metal sheet of aluminum or the like. Particularly, since the preserved substance contains a small amount of water, it is necessary to avoid steam permeation as much as possible. Therefore, a metal sheet or metal foil may be selected.

Besides the resin which composes the intermediate layer containing the oxygen absorber, as the inside layer, polymethylpentent, polystyrene, ethylene-vinyl acetate copolymer, and a mixture thereof can be used. Namely, a polyolefine group such as polyethylene, polypropylene, various kinds of ethylene-α olefin copolymer, ethylene acid copolymer, ionomer, polybutene or polymethylpentene can be used solely or by blending a plurality of the above-listed substances. It is also possible to use a sealant resin which is easily peelable and which is available on the market. The above-listed resins may be used either as they are extruded from a pellet or as the resin respectively formed into a film are pasted together.

It is possible to use a type of the sealant film which is available on the market and which has a multi-layered construction in order to become easily peelable. Moreover, it is possible to add a coloring pigment or filler to the resin of the inside layer to the extent not to diminish the expected properties of this layer.

In order to prevent oxygen from reaching the intermediate layer from the space where the preserved substance is located, the inside layer is designed to be capable of being adhered to the intermediate layer without any adhesive layer provided. An appropriate material for the inside layer is selected, which can exhibit proper heat sealability at the time of the manufacture of a bag or the sealing.

The film thickness of the inside layer is selected as appropriate according to a total thickness of the final form such as a container or a film. In the case of a container, an example construction would be: the inside layer 30–100 $\mu$m thick; the intermediate layer 50–200 $\mu$m thick; the gas-permeation-resistant layer 10–50 $\mu$m thick; and, in addition, a polyolefine layer 100–1,000 $\mu$m thick to retain strength. (In the case of a film, an example construction would be: the inside layer 15–30 $\mu$m thick; the intermediate layer 30–100 $\mu$m thick; and the gas-permeation-resistant layer 5–50 $\mu$m thick.)

Examples of the form of the packing material or package of this invention are as follows: The multi-layered film consisting of the inside layer, the intermediate layer and the outside layer is heat-sealed to form a bag, and a substance to be preserved is then placed in this bag. If a heavy-duty packing is desired, the package may be wrapped with kraft paper, corrugated fiberboard, a fiber drum or a metal can. Moreover, the multi-layered sheet consisting of the above-described layers made from materials thicker than films and having high rigidity is formed into a multi-layered container (such as tray, cup or bottle), in which the substance to be preserved is placed and which is then covered and hermetically sealed with a gas-permeation-resistant lid.

According to the present invention, the preserved substance having a low water content means any substance which has a low water content and has a small amount of water to diffuse, and to which a conventional self-reacting-type oxygen absorber cannot be applied. A preferred water activity (a) of such substance is 0.2–0.7, more preferably 0.2–0.5. In other words, this invention can be preferably applied to the substance having a low water activity, which needs to be preserved in a low-humidity, dry condition. In order to preserve the substance having the low water content, which requires a low-humidity preservation condition, a preferred relative humidity (RH) of the atmosphere where the substance having the low water content is preserved is 20–70%, more preferably 20–50%. A preferred water content of the low-water-content substance is 50 wt % or less, more preferably 10 wt % or less. However, as particular examples of this low-water-content substance (or packaged substance) which can fully utilize this invention, foods or medicines which react adversely to any increase of water and for which it is necessary to prevent any foreign matter from being mixed in may be listed, for example: powdery or granular foods (granular soup stock, beverage powder, confectionary powder, seasonings, cereal powder, nutritious food, health food, coloring agent, aromatic agent, or spices), powdery or granular medicines (powdered medicines, soap powder, tooth powder or industrial medicines), or any molded form (such as tablets) of the above-listed substances.

Examples of the packing material of this invention are as follows. Abbreviations herein used respectively stand for the following substances:

PET: polyethylene terephthalate
PE: polyethylene
OA: oxygen absorber
LLDPE: straight chain (or linear), low density polyethylene
EVOH: ethylene-vinyl alcohol copolymer
PP: polypropylene Examples of the Packing Material
Light Packing Paper:
  paper (or PET)/aluminum/PE/PE+OA/PE (LLDPE)
Heavy-Duty Packing Paper:
  paper (two or three layers)/PP/aluminum/PE/PE+OA/PE (LLDPE)

Heavy-Duty Packing Box:
 box (corrugated fiberboard)+(PE/PE/EVOH/PE/PE/PE+ OA/PE)
Container:
 container (PP/EVOH/PP)+lid (PET/aluminum/PE/PE+ OA/PE)
Container:
 container (PP/EVOH/PP+OA/PP)+lid (PET/aluminum/ PP)
Container:
 container (aluminum/PP+OA/PP)+lid (PET/aluminum/ PP)

EXAMPLE by using a closed ribbon blender with a heating jacket, 5 kg of potassium iodide was added to and mixed with 200 kg of reduced iron powder (average grain diameter: 30 μm; metal iron content: 95% or more) in a solution. Subsequently, the jacket was charged with steam and the inside of the mixer was degassed by a vacuum pump and was dried to coat the surface of the metal iron with potassium iodide, thereby obtaining an oxygen-absorbing composition.

Then, the oxygen-absorbing composition, polyethylene, white pigment and calcium oxide were kneaded at the weight ratio of 50:45:0.5:0.1 and were extruded by using a biaxial extruder, and the extruded material was cooled and crushed into a resin composition 1.

The resin composition 1 and polyethylene containing a white pigment at the percentage of 10% were laminated over a polyethylene film in the order listed above, by using a tandem laminator. Subsequently, polyethylene terephthalate (PET) and an aluminum foil were laminated over the polyethylene film side by means of extrusion laminating, thereby obtaining a multi-layered film composed of: PET layer (12 μm) (1); aluminum foil layer (outside layer: 9 μm) (2); polyethylene layer (20 μm) (3); oxygen-absorbing resin layer (intermediate layer: 60 μm) (4); and polyethylene (inside layer: 25 μm) (5), as shown in FIG. 1. In the oxygen-absorbing resin, iron grains with potassium iodide coated on the surface thereof were dispersed.

This film was formed into a bag (130 mm×140 mm) with its four sides sealed. This bag is hereinafter called the "packing bag of this invention." Another bag (130 mm×140 mm) with its four sides sealed was also made in the same manner as described above, except that sodium chloride was used, instead of potassium iodide, in the same amount as that of potassium iodide. This bag is hereinafter called the "comparative packing bag 1." A still another bag (130 mm×140 mm) with its four sides sealed was made in the same manner as described above, except that calcium chloride was used, instead of potassium iodide, in the same amount as that of potassium iodide. This bag is hereinafter called the "comparative packing bag 2." On the other hand, another bag was made in the same manner as described above by using a lamination film of PET, aluminum foil and polyethylene, which is available on the market. This bag is hereinafter called the "gas-permeation-resistant bag."

The water content of the resin composition 1, which was measured by the Karl Fischer method, was 500 ppm or less. The water content of the packing bag of this invention, the comparative packing bag 1, the comparative packing bag 2 and the gas-permeation-resistant bag was respectively measured in the same manner, and the resulted water content was within the range of 2,000 ppm through 3,000 ppm.

Measurement of Oxygen-Absorbing Capacity of Respective Bags 20 g of diatomaceous earth which was impregnated with 10 cc of a humidity conditioning solution of water and glycerol mixed at the ratio mentioned below was put in each bag, 40 cc of air was inserted into each bag, the mouth of which was then heat-sealed. These bags were preserved at temperatures of 25° C. or lower and the oxygen concentration within the bags after the passage of time for several days was analyzed by using gas chromatography. Table 1 shows the results of the analysis.

(Mixing Ratio of the Humidity Conditioning solution of Water and Glycerol)
RH100%: 100 parts by weight of water against 0 part by weight of glycerol
RH50%: 21 parts by weight of water against 79 parts by weight of glycerol
RH30%: 8 parts by weight of water against 92 parts by weight of glycerol

TABLE 1

|  | Elapsed Days | Packing Bag of This Invention | Comparative Packing Bag 1 | Comparative Packing Bag 2 | Gas-permeation-resistent Bag |
|---|---|---|---|---|---|
| RH100% | 5 days | 0.1% or less | 0.1% or less | 0.1% or less | 20.5% |
| RH50% | 10 days | 0.1% or less | 16.1% | 15.3% | 20.5% |
| RH30% | 15 days | 0.1% or less | 19.5% | 19.3% | 20.4% |

The comparative packing bags which used sodium chloride and calcium chloride as the accelerator showed a high oxygen-absorbing speed at high water and high humidity. However, it was confirmed that at low water and low humidity, the packing bag of this invention showed remarkably superior oxygen-absorbing capacity.

Preservation Test

Figure 2:
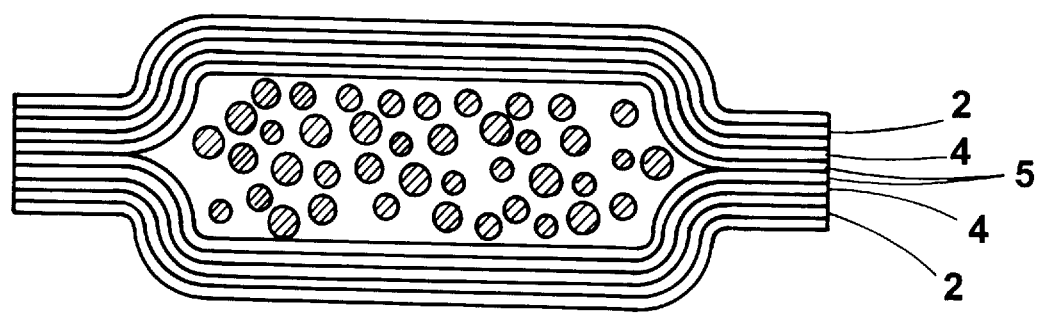
FIG. 2 is a model view of the condition where a substance to be preserved is enclosed in the multi-layered film shown in FIG. 1.

Powdered green tea, fish flour, granular soup stock, pancake mix, ascorbic acid powder, and silicon nitride, each in the amount of 50 g, were respectively filled in the above-described bags together with 30 cc of air, and the bags were hermetically sealed by means of heat sealing and were preserved at ordinary temperatures. FIG. 2 shows a model view of the packing bag of this invention in which the above-described contents are placed in a hermetically sealed manner. The conventional gas-permeation-resistant bag was packaged by three kinds of methods: (A) containing only the above-mentioned contents; (B) containing a water-dependent oxygen absorber (AGELESS FX-20 made by MITSUBISHI GAS CHEMICAL CO., INC.) together with the above-mentioned contents; and (C) containing a self-reacting oxygen absorber (AGELESS Z-ZOFT made by MITSUBISHI GAS CHEMICAL CO., INC.) together with the above-mentioned contents. After the preservation for one month, the oxygen concentration within the bags were analyzed by means of gas chromatography, the packing bags were then opened and the contents were evaluated. Table 2 shows the results of the evaluation.

The contents of the respective bags were dried food or powder which contain a small amount of water with the water contents and $a_w$ as described below. The water content was measured by the loss on drying method at a temperature of 105°C for 2 hours and $a_w$ was measured by an $a_w$ meter made by SHIBAAURA DENKI.

Powdered green tea:

Water content of 10% or less and $a_w$=0.4

Fish flour:

Water content of 10% or less and $a_w$=0.25

Granular soup stock:

Water content of 10% or less and $a_w$=0.35

Pancake mix:

Water content of 10% or less and $a_w$=0.5

Ascorbic acid powder:

Water content of 10% or less and $a_w$=0.4

Silicon nitride:

Water content of 10% or less and $a_w$=0.4

As shown Table 2, the packing bag of this invention exhibited a good absorbing capacity against the oxygen within the bag for each of the contents. As for the comparative packing bags 1 and 2, since the oxygen absorber contained no substance to supply water, the oxygen absorber could not catalyze the oxygen-absorbing reaction in the low-water environment and, as a result, the oxygen absorption was not sufficiently conducted. As for the gas-permeation resistant bag (A), since it did not contain any oxygen absorber, as a matter of course it could not remove the oxygen within the bag. Since the oxygen absorber of the gas-permeation-resistent bag (B) was the dependent reaction type which causes the oxygen-absorbing reaction by using water moved in from outside, it could not preferably attain the oxygen-absorbing reaction in the environment where the preserved dried substance from which such water could not be expected was enclosed. Accordingly, in the bags other than the packing bag of this invention, the flavor of the contents was spoiled and deterioration due to oxygen such as discoloration of the contents occurred.

On the other hand, in the gas-permeation-resistent bag (C) including the self-reacting-type oxygen absorber which itself contains the water-holding component, water from the water-holding component moved to the food, causing the powder to be solidified In the case of silicon nitride, which is a ceramic material, while the packing bag of this invention prevented deterioration by oxidation and property changes, the strength of the bags which did not show sufficient oxygen absorption was lowered due to deterioration by oxidation after sintering. With the packing bag which used the self-reacting-type oxygen absorber, moldability was lowered due to property changes which were deemed to be caused by the movement of water.

As described above, the present invention provides an oxygen-absorbing resin composition which can sufficiently cause oxygen absorption even in a low-water environment. Accordingly, the use of packing material which is made from this composition makes it possible to preserve substances such as dried foods, for example, powdery foods, in a low-oxygen environment with the certainty that the quality or properties of the preserved substance will not be lowered. Moreover, since there is no movement of water from the packing material to the preserved substance, it is possible, for example, to avoid the occurrence of deterioration such as solidification of the preserved substance. Furthermore, the resin composition of this invention is a novel oxygen-absorbing resin composition of the self-reacting type which does not require the coexistence of any water-holding substance.

What is claimed is:

1. An oxygen-absorbing resin composition, said composition being made by kneading an oxygen absorber with a thermoplastic resin, said composition comprising:

a reduced metal; and an accelerator which contains a metallic salt as its principal component, wherein the metallic salt is a metallic salt of iodide, or a metallic salt of bromide or a mixture thereof,

TABLE 2

| | | Packing Bag of This Invention | Comparative Packing Bag 1 | Comparative Packing Bag 2 | Gas-permeation-resistent Bag (A) | Gas-permeation-resistent Bag (B) | Gas-permeation-resistent Bag (C) |
|---|---|---|---|---|---|---|---|
| Powdered Green Tea | $a_w$ = 0.4 | 0.1% or less Good flavor and no discoloration | 18.8% Flavor spoiled and discoloration caused | 18.5% Flavor spoiled and discoloration caused | 20.0% Flavor spoiled and discoloration caused | 18.7% Flavor spoiled and discoloration caused | 0.1 or less Slightly good flavor and no discoloration |
| Fish Flour | $a_w$ = 0.25 | 0.1% or less Good flavor and no discoloration | 19.5% Flavor spoiled and discoloration caused | 18.9% Flavor spoiled and discoloration caused | 19.8% Flavor spoiled and discoloration caused | 19.2% Flavor spoiled and discoloration caused | 0.1% or less Flavor spoiled and no discoloration |
| Granular Soup Stock | $a_w$ = 0.35 | 0.1% or less Good flavor and no solidification | 19.0% Flavor spoiled and no solidification | 19.1% Flavor spoiled and no solidification | 20.0% Flavor spoiled and no solidification | 18.5% Flavor spoiled and no solidification | 0.1% or less Good flavor and solidification caused |
| Pancake Mix | $a_w$ = 0.5 | 0.1% or less Good flavor | 14.4% Flavor spoiled | 13.0% Flavor spoiled | 20.0% Flavor spoiled | 19.1% Flavor spoiled | 0.1% or less Flavor spoiled |
| Ascorbic Acid Powder | $a_w$ = 0.4 | 0.1% or less No discoloration | 16.6% No discoloration | 17.0% Discoloration caused | 18.8% Discoloration caused | 18.8% Discoloration caused | 0.1% or less Discoloration |
| Silicon Nitride | $a_w$ = 0.4 | 0.1% or less No abnormality | 17.9% Strength lowered after sintering | 17.1% Strength lowered after sintering | 20.2% Strength lowered after sintering | 19.9% Strength lowered after sintering | 0.1% or less Moldability at the time of sintering lowered | wherein the composition is capable of absorbing said oxygen in an environment of not more than 50% relative humidity and in absence of a water-supplying component and wherein the water content of said composition is no more than 1% by weight.

2. A package containing a preserved substance to be kept in a dry condition inside sheet-shaped packing material which is formed from an oxygen-absorbing resin composition, said composition being made by kneading an oxygen absorber with a thermoplastic resin, said composition comprising:

a reduced metal; and an accelerator which contains a metallic salt as its principal component, wherein the metallic salt is a metallic salt of iodide, or a metallic salt of bromide or a mixture thereof, wherein the composition is capable of absorbing said oxygen in said sheet-shaped packing material in absence of a water-supplying component and wherein the water content of said composition is no more than 1% by weight and when the relative humidity of the environment is not more than 50%.

3. A preserving method, comprising the steps of:

placing a substance to be preserved, which is to be kept in a dry condition, inside sheet-shaped packing which is formed from an oxygen-absorbing resin composition, said composition being made by kneading an oxygen absorber with a thermoplastic resin, said composition comprising a reduced metal and an accelerator which contains a metallic salt as its principal component, wherein the metallic salt is a metallic salt of iodide, or a metallic salt of bromide or a mixture thereof and wherein the water content of said composition is no more than 1% by weight and when the relative humidity of the environment is not more than 50%; and exposing the substance to be preserved to the packing material.

4. An oxygen-absorbing composition comprising a reduced metal and an accelerator, said accelerator comprising a metallic salt as its principal component, wherein the metallic salt is a metallic salt of iodide, or a metallic salt of bromide or a mixture thereof, wherein the composition is capable of absorbing said oxygen in an environment of not more than 50% relative humidity and in absence of a water-supplying component and wherein the water content of said composition is no more than 1% by weight.

5. An oxygen-absorbing resin composition made by kneading an oxygen absorber with a thermoplastic resin, said oxygen absorber comprising a reduced metal; and an accelerator which contains a metallic salt as its principal component, wherein the metallic salt is a metallic salt of iodide, or a metallic salt of bromide or a mixture thereof, wherein said oxygen-absorbing resin composition is capable of absorbing said oxygen in substantial absence of available moisture and contains no more than 1% water content by weight and when the relative humidity of the environment is not more than 50%.

6. The oxygen-absorbing resin composition according to claim 1, wherein said metallic salt is an alkali metallic salt.

7. The oxygen-absorbing resin composition according to claim 6, wherein said alkali metallic salt is a potassium salt or a sodium salt or a mixture thereof.

8. The oxygen-absorbing resin composition according to claim 1, wherein the water content of said oxygen absorber is 500 ppm or less.

9. A sheet-shaped packing material which is formed out of the composition claimed in any one of claims 1, 4 or 5 through 8.

10. A multi-layered packing material, comprising:

a gas-permeation-resistant outside layer on the atmosphere side;

an intermediate layer made of the composition claimed in any one of claims 1, 4 and 5 through 8; and an inside layer for separating the intermediate layer from a substance to be preserved.

11. The multi-layered packing material according to claim 10, being composed in a sheet shape in its entirety.

12. The oxygen-absorbing composition according to claim 4, wherein said metallic salt is an alkali metallic salt.

13. The oxygen-absorbing composition according to claim 12, wherein said alkali metallic salt is a potassium salt or a sodium salt or a mixture thereof.

14. The oxygen-absorbing composition according to claim 4, wherein the water content of said oxygen absorber is 500 ppm or less.

15. A package containing a preserved substance to be kept in a dry condition inside sheet-shaped packing material which is formed from an oxygen-absorbing composition, said composition comprising a reduced metal and an accelerator, said accelerator comprising a metallic salt as its principal component, wherein the metallic salt is a metallic salt of iodide, or a metallic salt of bromide or a mixture thereof, wherein the composition is capable of absorbing said oxygen in an environment of not more than 50% relative humidity and in absence of a water-supplying component and wherein the water content of said composition is no more than 1% by weight.

16. A preserving method, comprising the steps of:

placing a substance to be preserved, which is to be kept in a dry condition, inside sheet-shaped packing material which is formed from an oxygen-absorbing composition, said composition comprising a reduced metal and an accelerator which contains a metallic salt as its principal component, wherein the metallic salt is a metallic salt of iodide, or a metallic salt of bromide or a mixture thereof and wherein the water content of said composition is no more than 1% by weight and where the relative humidity of the environment is not more than 50%; and exposing the substance to be preserved to the packing material.

17. The preserving method of any one of claims 3 and 16, wherein the metallic salt of the sheet-shaped packing material is an alkali metallic salt.

18. The preserving method of claim 17, wherein said alkali metallic salt is a potassium salt or a sodium salt or a mixture thereof.

* * * * *

UNITED STATES PATENT AND TRADEMARK OFFICE
CERTIFICATE OF CORRECTION

PATENT NO. : 5,889,093

DATED : Mar. 30, 1999

INVENTOR(S) : Hatakeyama et al.

It is certified that error appears in the above-identified patent and that said Letters Patent is hereby corrected as shown below:

Col. 5, line 42, change "polymethylpentent" to --polymethylpentene--.

Col. 5, line 51, change "resin" to --resins--.

Col. 7, line 16, change "by" to --By--.

Col. 8, line 50, insert --of-- after "methods".

Col. 8, line 67, change "SHIBAAURA" --SHIBAURA--.

Claim 3, Col. 11, line 23, insert --material-- after "packing".

Signed and Sealed this

Twenty-first Day of September, 1999

Attest:

Q. TODD DICKINSON

*Attesting Officer*  *Acting Commissioner of Patents and Trademarks*